United States Patent

Kazawa et al.

Patent Number: 5,276,709
Date of Patent: Jan. 4, 1994

[54] CORRELATION CODE TRANSMISSION SYSTEM

[75] Inventors: Tohru Kazawa, Kokubunji; Takanori Miyamoto, Fuchu; Toshiro Suzuki, Tama; Takashi Morita; Ichiro Mass'e, both of Yokohama, all of Japan

[73] Assignee: Hitachi, Ltd., Tokyo, Japan

[21] Appl. No.: 640,351

[22] PCT Filed: Aug. 31, 1990

[86] PCT No.: PCT/JP90/01118
§ 371 Date: Jan. 15, 1991
§ 102(e) Date: Jan. 15, 1991

[87] PCT Pub. No.: WO91/11064
PCT Pub. Date: Jul. 25, 1991

[30] Foreign Application Priority Data

Jan. 8, 1990 [JP] Japan .................................. 2-658

[51] Int. Cl.⁵ .................................................. H04B 14/04
[52] U.S. Cl. ........................................ 375/25; 375/18; 375/94; 375/116
[58] Field of Search ............... 375/112, 114, 116, 113, 375/25, 18, 94; 370/18, 105.1, 105.4, 106

[56] References Cited

U.S. PATENT DOCUMENTS

| | | | |
|---|---|---|---|
| 4,276,642 | 6/1981 | Siglow et al. | 370/105.1 |
| 4,597,087 | 6/1986 | Kadin | 375/115 |
| 4,675,886 | 6/1987 | Surie | 375/116 |
| 4,679,188 | 7/1987 | Fukuda et al. | 370/105.1 |
| 4,748,623 | 5/1988 | Fujimoto | 375/114 |
| 4,763,339 | 8/1988 | Sutphin et al. | 375/113 |

Primary Examiner—Curtis Kuntz
Assistant Examiner—Don N. Vo
Attorney, Agent, or Firm—Antonelli, Terry, Stout & Kraus

[57] ABSTRACT

A correlation transmission coder or a correlation code transmission system whereby the correlation transmission coder generates a transmission signal to be sent on a transmission line, the transmission signal being determined, as with a partial response class 4 signal, by using already-transmitted data strings and data being transmitted by adding a specified length of frame synchronization pattern in each constant frame period. What is characteristic of this invention is the provision of which reset or preset in each frame period registers that are used commonly by a transmission system and a precoder that makes up the coder. Another characteristic is the provision of which inserts, immediately before the frame synchronization pattern, internal data that is added to the transmission data by the transmission system and the precoder.

10 Claims, 15 Drawing Sheets

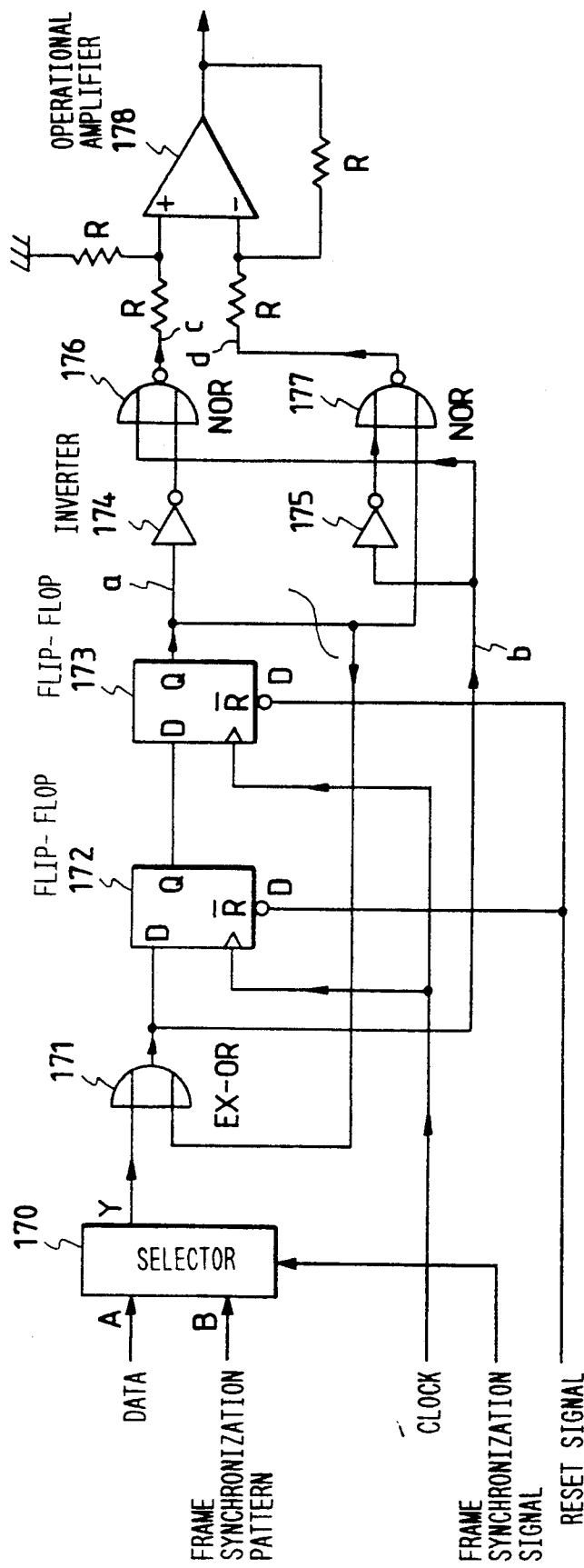

FIG. 8(a)

CASE OF RESET (0 0)

$X_Y$ : INPUT/OUTPUT

| STATE | OUTPUT ($Y_{n-2}$, $Y_{n-1}$, $Y_n$) | | | | | | | | |
|---|---|---|---|---|---|---|---|---|---|
| 0 0 | 0 0 | 0/0<br>1/1 | -1 0 | 0/1<br>1/1 | -1 -1 | 0/0<br>1/1 | 0 -1 | 0/0<br>1/1 |
| 0 1 | 0 -1 | 0/0<br>1/1 | 1 -1 | 0/0<br>1/1 | 1 0 | 0/0<br>1/1 | / | |
| 1 0 | -1 0 | 0/0<br>1/1 | 0 1 | 0/0<br>1/1 | -1 1 | 0/0<br>1/1 | / | |
| 1 1 | 0 0 | 0/0<br>1/1 | 1 0 | 0/0<br>1/1 | 1 1 | 0/0<br>1/1 | 0 1 | 0/0<br>1/1 |

FIG. 8(b)

CASE OF RESET (1 1)

| STATE | OUTPUT ($Y_{n-2}$, $Y_{n-1}$, $Y_n$) | | | | | | | | |
|---|---|---|---|---|---|---|---|---|---|
| 0 0 | 0 0 | 0/0<br>1/-1 | -1 0 | 0/0<br>1/-1 | -1 -1 | 0/0<br>1/-1 | 0 -1 | 0/0<br>1/-1 |
| 0 1 | 0 -1 | 0/0<br>1/-1 | 1 -1 | 0/0<br>1/-1 | 1 0 | 0/0<br>1/-1 | / | |
| 1 0 | -1 0 | 0/0<br>1/-1 | 0 1 | 0/0<br>1/-1 | -1 1 | 0/0<br>1/-1 | / | |
| 1 1 | 0 0 | 0/0<br>1/-1 | 1 0 | 0/0<br>1/-1 | 1 1 | 0/0<br>1/-1 | 0 1 | 0/0<br>1/-1 |

FIG. 9
(1)
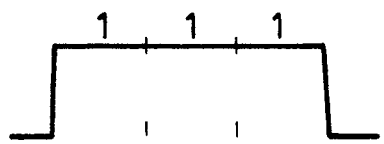
(2)
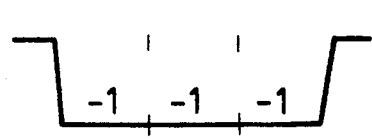
(3)
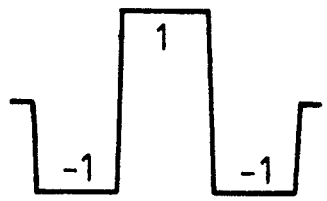
(4)
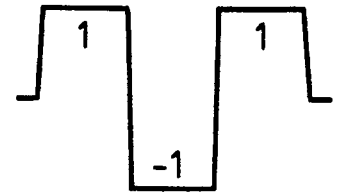
(5)
(6)
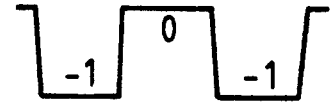

T : BURST PERIOD   $T_B$ : BURST LENGTH $T_G$ : GUARD TIME   $T_D$ : TRANCEMISSION DILAY

CORRELATION CODE TRANSMISSION SYSTEM

TECHNICAL FIELD

The present invention relates to a transmission system using correlation codes, and more particularly to a method for generating data to be transmitted as well as receiving data and to a configuration of an apparatus that performs such operations.

BACKGROUND ART

In prior art transmission systems using the correlation code, a specific coding rule is introduced that governs a plurality of adjoining input data to narrow the band width of an output signal.

For example, in a system with a bit rate of $f_0$, a secondary bipolar (modified duobinary) code, disclosed in a literature entitled "Advance in PCM Communication" (Sanpo) by Inose and Miyagawa at page 89, has a main lobe of less than $f_0/2$ and its band is one fourth that of the ordinary non-return-to-zero (NRZ) code.

In a transmission system using the correlation code, the output at a certain time is determined by a combination of a present input as well as past inputs, so that it is difficult to fix a frame synchronization pattern. For this reason, a new frame synchronization method was proposed in the Japanese Patent Laid-Open No. 119947/1984 "Partial Response Transmission Method." This method establishes the frame synchronization by deliberately inserting a code violation pattern although the frame synchronization pattern is not fixed.

With the above prior art (Japanese Patent Laid-Open No. 119947/1984), while the frame synchronization becomes possible, the frame synchronization pattern varies from one frame to another because the pattern at the transmitter depends on the past inputs. Therefore, no fixed frame synchronization patterns can be observed on the transmission line. Another problem is that when a precoder, described at page 83 of the above reference "Advance in PCM Communication," is used, not only does the dependence of the output of the coder on all the past data make it impossible to fix the frame synchronization pattern, but also bit errors that occurred in the precoder circuit affect the data at succeeding stages. Therefore, it is necessary to suppress this error propagation.

SUMMARY OF THE INVENTION

The object of this invention is to provide a transmission system which fixes the frame synchronization pattern on the transmission line and thereby makes the observation of the transmitted data easy.

To make the frame synchronization pattern constant on the transmission line, this invention resets or presets registers, which make up the coder, in each frame period, as detailed later. However, resetting or presetting the registers in the coder for each frame period results in a complete loss of past recorded data and thus may cause a code violation. In the event of such code violation, the receiver cannot perform correct decoding. To prevent decoding error also requires resetting a Viterbi decoder, and this complicates the construction of the receiver.

Another object of this invention is to provide a transmission system which can fix the frame synchronization pattern without generating a code violation or facilitating the observation of transmitted data.

DISCLOSURE OF THE INVENTION

To achieve the above objective, this invention provides a means to reset or preset a group of registers built into the coder in the transmitter for each frame of a fixed interval. It also provides a means to bypass the frame synchronization signal, with the contents of the registers kept intact.

Now, by referring to FIGS. 1 and 2, these means will be described.

FIG. 1 shows the configuration of the coder.

The coder consists of: registers 41 to 43; constant multiplier 31 to 33; modulo-2 adders 21 to 23; adders 61 to 63; a selector 1 and an inverter 50. A means for fixing the output signal is realized by sending a reset or preset signal 7 inverted by the inverter 50 to reset or preset terminals 71 to 73 of the registers 41 to 43.

FIG. 2 shows the configuration of another coder, which consists of: a selector 11 to select between an output of the modulo adder 22 and a zero input 5; another selector 12 to choose between the adder 62 and the zero input 5; and the devices shown in FIG. 1, i.e. the registers 41 to 43, constant multipliers 31 to 33, modulo-2 adders 21 to 23, adders 61 to 63 and the selector 1. The selector 11 is controlled by a frame synchronization signal 4.

To achieve the above objective, the coder is provided with a 3-input selector, which is controlled by a frame synchronization signal to switch between the transmitted data from a higher-level device, the frame synchronization pattern, and the internal data of the coder. FIG. 14 shows the configuration of still another coder, which consists of registers 41 to 43; constant multiplier 31 to 33; modulo-2 adders 21 to 23; adders 61 to 63; and a selector 10. The selector 10 is controlled by frame synchronization signals 8a, 8b to select between the data 2, frame synchronization pattern 3 and code internal signal 6.

Next, the operation of the coder which generates the correlation code is explained.

First, a transmitted series consists, as shown in FIG. 3, of transmitted data and a frame synchronization pattern for establishing the frame synchronization. The frame synchronization pattern repeats itself at specified periods T, inserted in the transmitted data. The frame synchronization pattern is made up of a plurality of time slots and is output while the frame synchronization signal is high. The coder also generates a reset or preset signal (which precedes the frame synchronization signal) in synchronism with the frame synchronization signal to perform resetting or presetting of the internal registers.

By using the timing signal of FIG. 3, the coder of FIG. 1 performs the following operations. The data 2 and the frame synchronization pattern 3 are sent to the selector 1, which chooses the frame synchronization pattern when the frame synchronization signal is high and, when it is low, data. The output of the selector 1 is fed to the register 43 which generates a coding rule, from which it is shifted to the succeeding registers 42, 41 in synchronism with a transmission clock. The output of each register is transferred through the constant multipliers 31 to 33 to the modulo-2 adders 21 to 23 where they are added with a value from the preceding-stage modulo-2 adder or with a value from the constant multiplier at the third stage. The added value is finally added with the output of the selector 1 and then fed to the register 43. The outputs of the registers and constant multipliers at each stage are also added up by the adders 61 to 63 to produce an output signal.

To eliminate the effect of bit errors in the transmission line, the coder of correlation code employs the above modulo-2 adders 21 to 23, called a precoder. This means that the data that was input in the past is fed back to the registers, so that the output of a conventional coder depends on the contents of the past data even when a fixed frame synchronization pattern 3 is entered, resulting in the frame synchronization pattern, changing from one frame to another. With this invention, therefore, the internal registers 41 to 43 are reset or preset in each frame by the reset or preset signal of FIG. 3 or by a signal passed through the inverter 50 in order to make the internal registers assume the same values before each frame synchronization pattern 3 is entered. In FIG. 2, the output of the constant multiplier 33 for the first register 43 is applied to the modulo-2 adder 22 and to the adder 62. The outputs of these adders 22, 62 are fed to selectors 11, 12, each of which selects between the respective adder output and the zero value 5 and sends the selected signal again to the modulo-2 adder 23 or to the adder 63. The outputs of the selectors 11, 12 are switched by the frame synchronization signal as follows:

(1) The selector output is the zero input 5 when the frame synchronization signal is high; and (2) The selector output is 71 or 72 when the frame synchronization signal is low, in order to remove effects the past data contained in the registers 41 to 43 has on the generation of the frame synchronization pattern. With the above coding methods of FIG. 1 and 2, the frame synchronization patterns generated by the coder can be made equal for all frames, allowing the frame synchronization in the correlation coding system to be performed easily and rapidly.

Now, explanations are given to the above means employed to achieve objectives other than those mentioned earlier.

FIG. 15 shows the data format of a transmission frame. Immediately before the frame synchronization pattern 3, a coder internal data 6 is inserted. This insertion operation is controlled by the frame synchronization signal 8. During a time period Ta in which the frame synchronization signal 8a is high and the other frame synchronization signal 8b is low, the coder internal data 6 is issued. In a time period Tb in which the frame synchronization signal 8a is low and the second frame synchronization signal 8b is high, the frame synchronization pattern 3 is sent out. In a time period Tc in which both of the frame synchronization signals 8a and 8b are low, data 2 is transmitted.

This process is described by referring to FIG. 14. The selector 10 is controlled by the frame synchronization signal 8 to output either data 2, frame synchronization pattern 3, or coder internal data 6. When the selector 10 outputs the coder internal data 6, the modulo-2 adder 23 receives the same internal data 6 at its two inputs. Thus, the output of the modulo-2 adder 23 necessarily becomes zero. This output is entered into the registers 43 to 41 and successively shifted through them. Suppose the number of registers 41 to 43 is N. If the time duration in which the coder internal data 6 is output from the selector 10 is set N bits long, the contents of N registers 41 to 43 will all be set to zero, coding the frame synchronization pattern 3 into the same signal. In this case, because the register contents are not reset forcibly from outside and are thus reflected as the coder internal data 6 in the transmission signal, no code violation occurs.

BRIEF DESCRIPTION OF THE DRAWINGS

FIG. 7 is a circuit diagram showing one embodiment of the coder of FIG. 5;

FIG. 8(a) and 8(b) are diagrams showing output patterns produced by the internal registers of the coder when reset and those by the internal registers when preset, respectively;

FIG. 9 shows patterns violating the coding rule;

BEST MODE FOR CARRYING OUT THE INVENTION

Now, a first embodiment of this invention will be described by referring to FIGS. 4 through 13.

Figure 4:
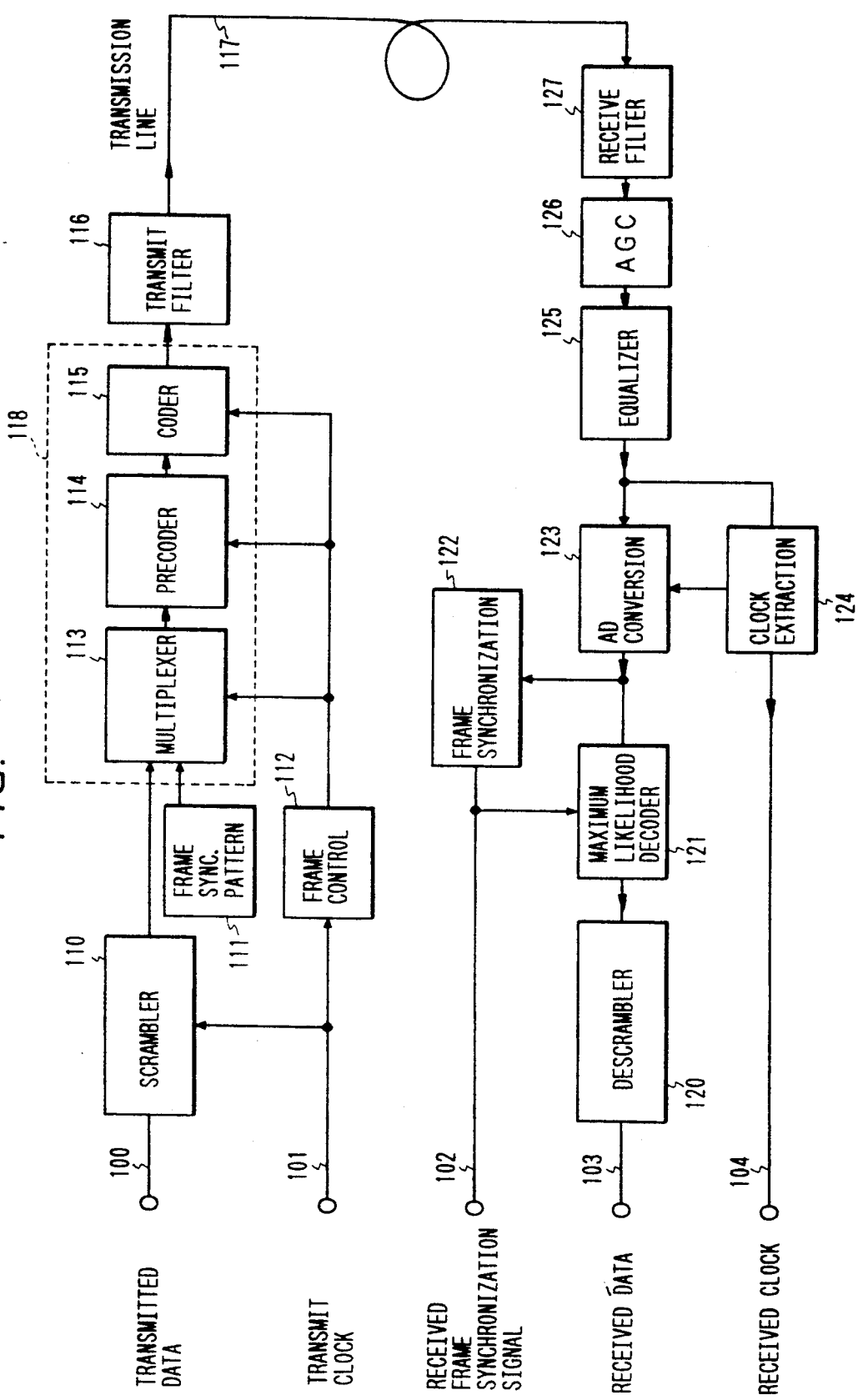
FIG. 4 is a block diagram showing a transmission system to which this invention is applied.

FIG. 4 shows the configuration of a transmission system using the correlation code to which the first embodiment is applied. Transmitted data 100 synchronized with a transmit clock 101 is sent to a scrambler 110 to suppress the length of continuous zero to a finite one. The output of the scrambler 110 and a fixed frame synchronization pattern 111 are fed to a multiplexer 113, which performs rate conversion and multiplexing on them. The multiplexer 113 then sends its output to a precoder 114 for correlation code, a coder 115 and to a transmit filter 116 that suppresses unwanted band components, before putting its output on a transmission line 117. A frame control circuit 112, for inserting a frame synchronization pattern at certain fixed periods, is provided to control the internal state of the multiplexer 113, precoder 114 and coder 115. The multiplexer 113, precoder 114 and coder 115 constitute a coder 118.

On the receiver, a receive filter 127 removes the out-of-band noise; and an eye pattern for data discrimination is opened by an automatic gain control (AGC) 126, which performs level control, and an equalizer 125, which compensates distortion caused by a transmission line. The output of the equalizer 125 is then entered into an A/D converter 123 for analog-digital conversion and also into a clock extractor 124 that extracts a clock component from the received signal.

The A/D-converted data is fed to a frame synchronizer 122 and also to a maximum likelihood decoder 121, which decodes the data into a data string of "0" and "1" according to the coding rule of correlation code. The maximum likelihood decoder 121 then outputs the decoded data to a descrambler 120 that has a characteristic opposite to that of the scrambler 110 on the transmitter. Now, the descrambler output is taken as received data. A clock signal picked up by the clock extractor 124 is used in the A/D conversion to produce a sampled data for decoding. A frame synchronization signal 102 produced by the frame synchronizer 122 is used to activate or deactivate the maximum likelihood decoder 121. This is the example embodiment of this invention as applied to the transmission system employing the correlation code. Among the possible coding rules of correlation code may be: $F(D)=1+D$, $1-D$, $1+D^2$, $1-D^2$, $1+D^3$, $1-D^3$, $1+D+D^2+D^3$, and $1+D-D^2-D^3$, where D represents a delay in transmission bit rate. The above embodiment can be used on general applications with any coding rule.

Next, we will explain the embodiment of this invention when the coding rule of $F(D)=1-D^2$ (partial response class 4) is chosen.

Figure 5:
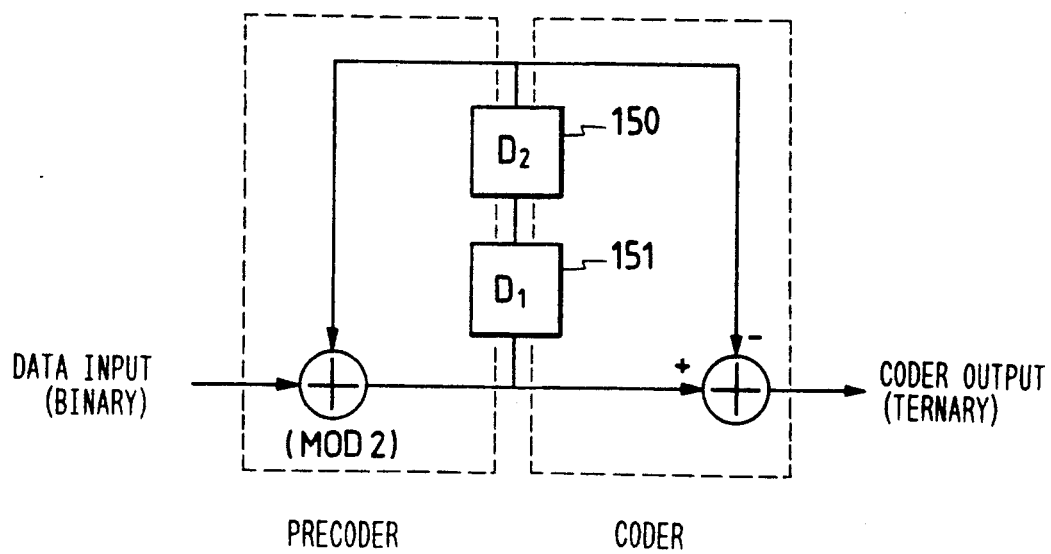
FIG. 5 is a diagram showing the configuration of a coder for PR4 (modified duobinary) code.
Figure 6:
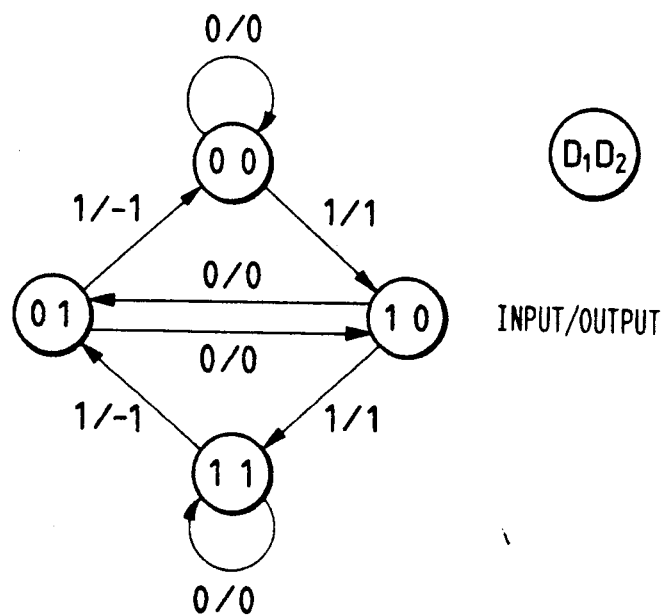
FIG. 6 is a finite state diagram or state transition diagram for the coder.

FIG. 5 shows a precoder and a coder for the coding rule of $1-D^2$. This coder produces a tertiary output in response to a binary input. The coder has two internal registers 150, 151. FIG. 6 shows a finite state diagram with the contents of the two internal registers assumed to be $D_1$ and $D_2$.

FIG. 7 shows one example circuit of the coder 118 of FIG. 5. This circuit resets the internal registers when it receives the frame synchronization pattern, by using reset terminals of two D flip-flops 172, 173. The modulo-2 adder in the precoder is realized by an Exclusive-OR circuit 171. Since $F(D)=1-D^2$ is used, this coder requires a subtractor which is realized by an operational amplifier 178 and a resistor R. The levels of (a, b) and (c, d) are determined as follows by four logic gates 174 to 177 for the operational amplifier 178.

| (a, b) | (c, d) |
|--------|--------|
| H, H   | O, O   |
| H, L   | O, H   |
| L, H   | H, O   |
| L, L   | O, O   |

Figure 3:
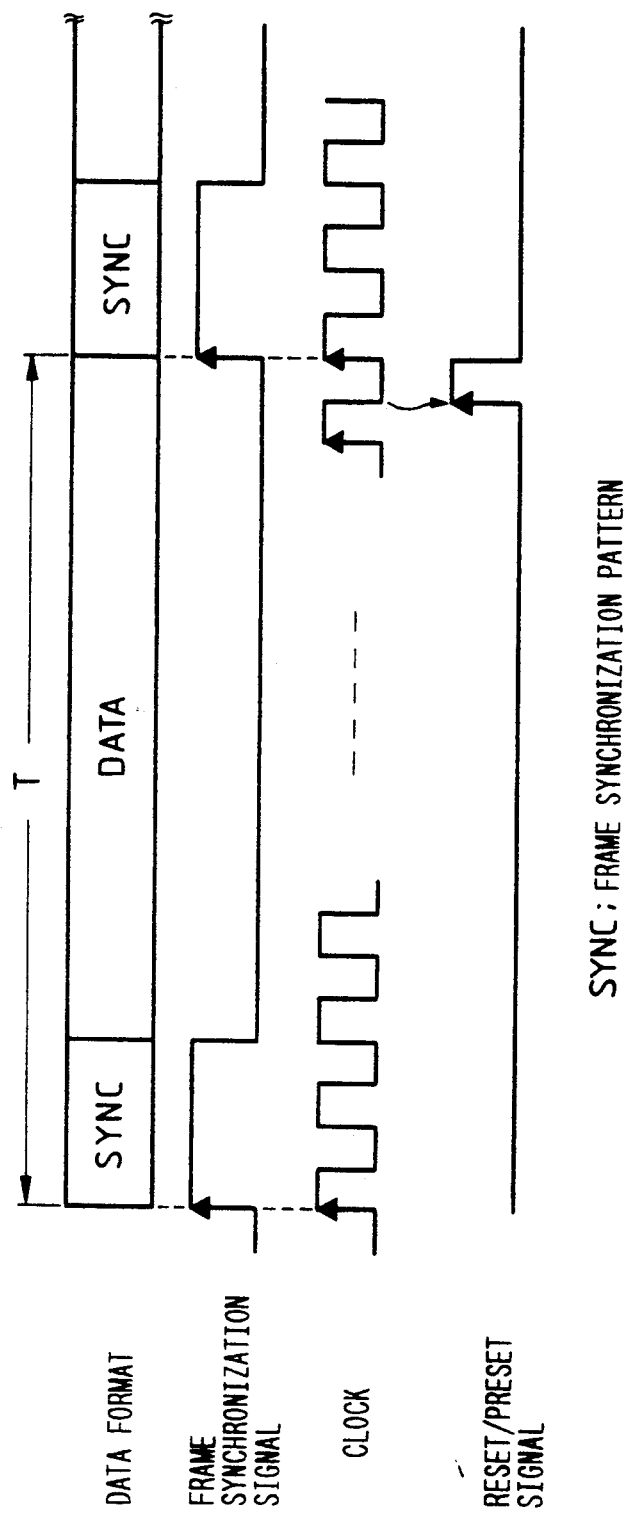
FIG. 3 is a timing chart showing the operation timing of FIG. 1.

As described in FIG. 3, the reset signal is entered prior to the frame synchronization signal. At this time, depending on the values of the two registers immediately before being reset, there is a possibility that an output violating the coding rule $1D^2$ may be generated by the frame synchronization pattern immediately after the resetting.

FIG. 8 shows the relationship between the internal state of the register immediately before being reset or preset and its output after resetting or presetting. $Y_{n-2}$ and $Y_{n-1}$ represent output values two time slots and one time slot before the resetting or presetting, respectively; and $Y_n$ indicates an output value immediately after the resetting or presetting.

When $F(D)=1-D^2$ is used, the output series has patterns that are prohibited by the coding rule, as seen from FIG. 6. It is not desirable that the code violating patterns are produced by the above presetting or resetting operation. However, examination of $Y_{n-2}$, $Y_{n-1}$ and $y_n$ of FIG. 8 shows that entering "0" as the frame synchronization pattern after resetting or presetting will put all cases in compliance with the coding rule. Thus, by entering the frame synchronization pattern, which has "0" at the head, immediately after the resetting or presetting, it is possible for the output of the coder to assume a fixed frame synchronization pattern at specified intervals.

Further, it is possible to select from the following alternatives as a frame synchronization pattern that follows the starting "0."

(1) Arbitrary pattern that meets the coding rule; and
(2) Arbitrary code violation pattern Unlike the above-mentioned setting or presetting, the code violation can be detected and the frame synchronization established when the case (2) pattern is chosen. In the case of $F(D)=1-D^2$, the possible choice for the code violation pattern includes (A, A, A), (−A, −A, −A), (−A, A, −A), (A, −A, A), (A, O, A), and (−A, O, −A) (where A represents an arbitrary level).

Figure 10:
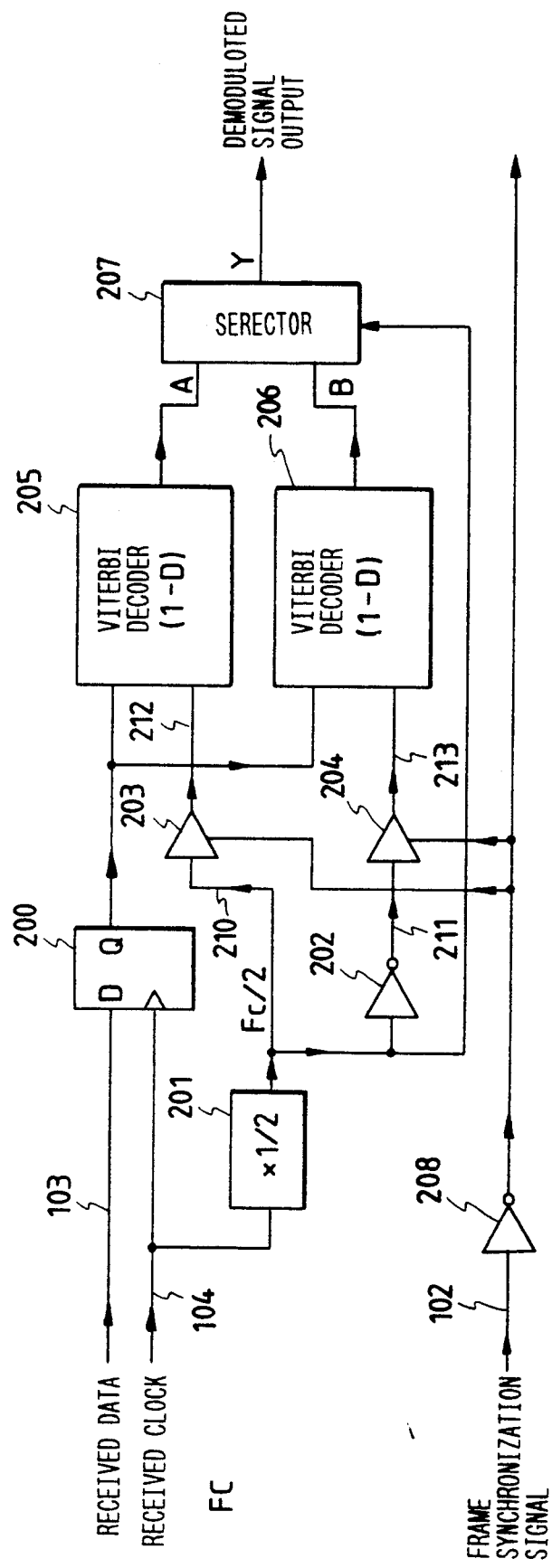
FIG. 10 is a circuit diagram for maximum likelihood decoding.

Next, let us turn to an example configuration of the receiver to which this invention is applied. As shown in FIG. 4, the receiver can employ the maximum likelihood decoding that complies with the coding rule of the correlation code. FIG. 10 shows an example of a circuit configuration of the decoder for $F(D)=1-D^2$. A method is available to form the decoder for $1-D^2$ by using two decoders of $1-D$ and switching between them alternately at each reception of input. Since this invention resets the internal registers at the time of sending the frame synchronization pattern, the coding rule is canceled. Therefore, the decoding performed by the receiver based on the coding rule will result in a wrong decision, so that it is necessary also for the receiver to stop the correlation decoding which is based on the frame synchronization signal.

Figure 11:
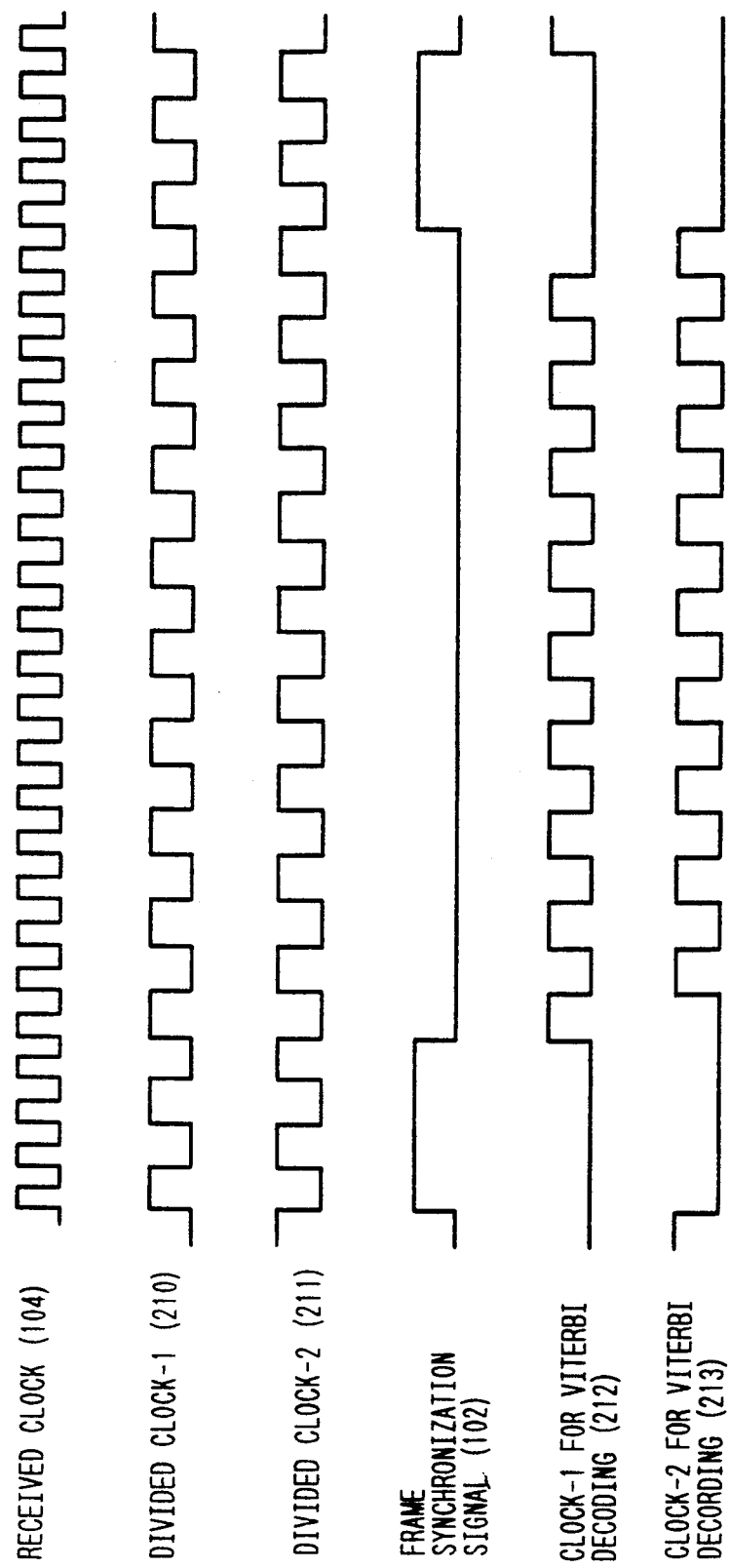
FIG. 11 is a timing chart illustrating the operation of the circuit of FIG. 10.

The operation of the decoder of FIG. 10 is explained by referring to the timing chart of FIG. 11. First, the received data 103 entered in synchronism with the receive clock 104 is latched by the D flip-flop 200. At the same time, the receive clock 104 is divided by a frequency divider 201 and inverted by an inverter 202 to generate an inverted clock 211. On the other hand, the frame synchronization signal 102 generated by the receiver is inverted by an inverter 208. The inverted frame synchronization signal is applied to gates 203, 204 to enable or disable the two divided clocks 210, 211, producing Viterbi decoder clocks 212, 213. Viterbi decoders 205, 206 operate alternately according to these clocks to produce the result of decoding. A selector 207 selects between the outputs of the Viterbi decoders that are activated by the corresponding clocks.

As mentioned above, with the frame synchronization signal used as an enable signal, the maximum likelihood decoding circuit according to this invention can be obtained.

Figure 12:
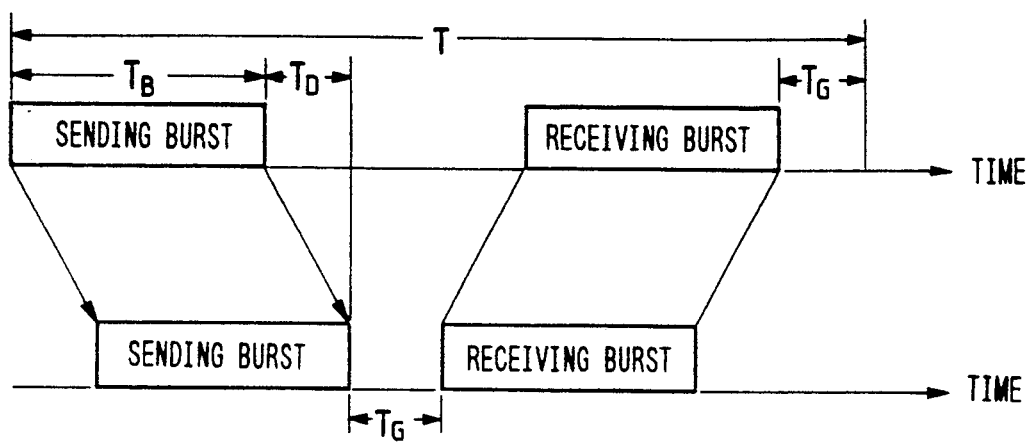
FIG. 12 is a diagram showing a two-wire transmission system using a time compressed multiplexing (TCM)
Figure 13:
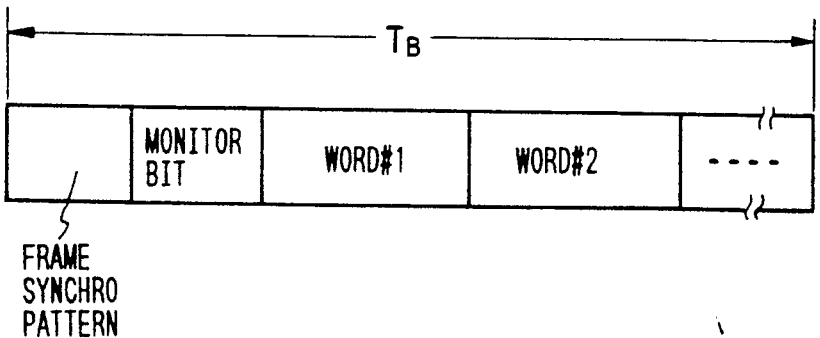
FIG. 13 is a diagram showing a frame format of burst data.

FIGS. 12 and 13 show embodiments of this invention as applied to a 2-wire transmission system. For the 2-wire transmission system, there is available a time compressed multiplexing (TCM). This is a method in which, as shown in FIG. 12, the transmission burst and the reception burst are alternately used on a time sharing basis. In this case, the period of the transmission burst T is chosen so that the following relationship holds:

$$T \geq 2 \times (T_B + T_D + T_G)$$

where $T_B$ is a burst length, $T_D$ is a transmission delay, and $T_G$ is a guard time between the transmission and reception bursts. A frame format of FIG. 13 may be considered for the transmission burst. In this case the frame synchronization pattern is transmitted repeatedly at constant periods T. The resetting or presetting according to this invention need be done either immediately after the transmission burst or immediately before the sending of the frame synchronization pattern. This frame format therefore can also be applied to the 2-wire transmission system.

In resetting the registers in the transmitter, the synchronization pattern is chosen as "000***" (* is either 0 or 1) and resetting is carried out immediately after the input of the second "0" bit. In this embodiment, after the first two bits have established the DC balance for the $1-D^2$ filter, the registers in the transmitter are reset and then supplied with a "0" bit that does not violate the coding rule and with succeeding "***", to generate the frame synchronization pattern. In the above example, by choosing a frame synchronization pattern for the $1-D^2$ filter that has three consecutive "0" bits at the head, the dc balance function and the frame synchronization function can be realized.

Figure 15:
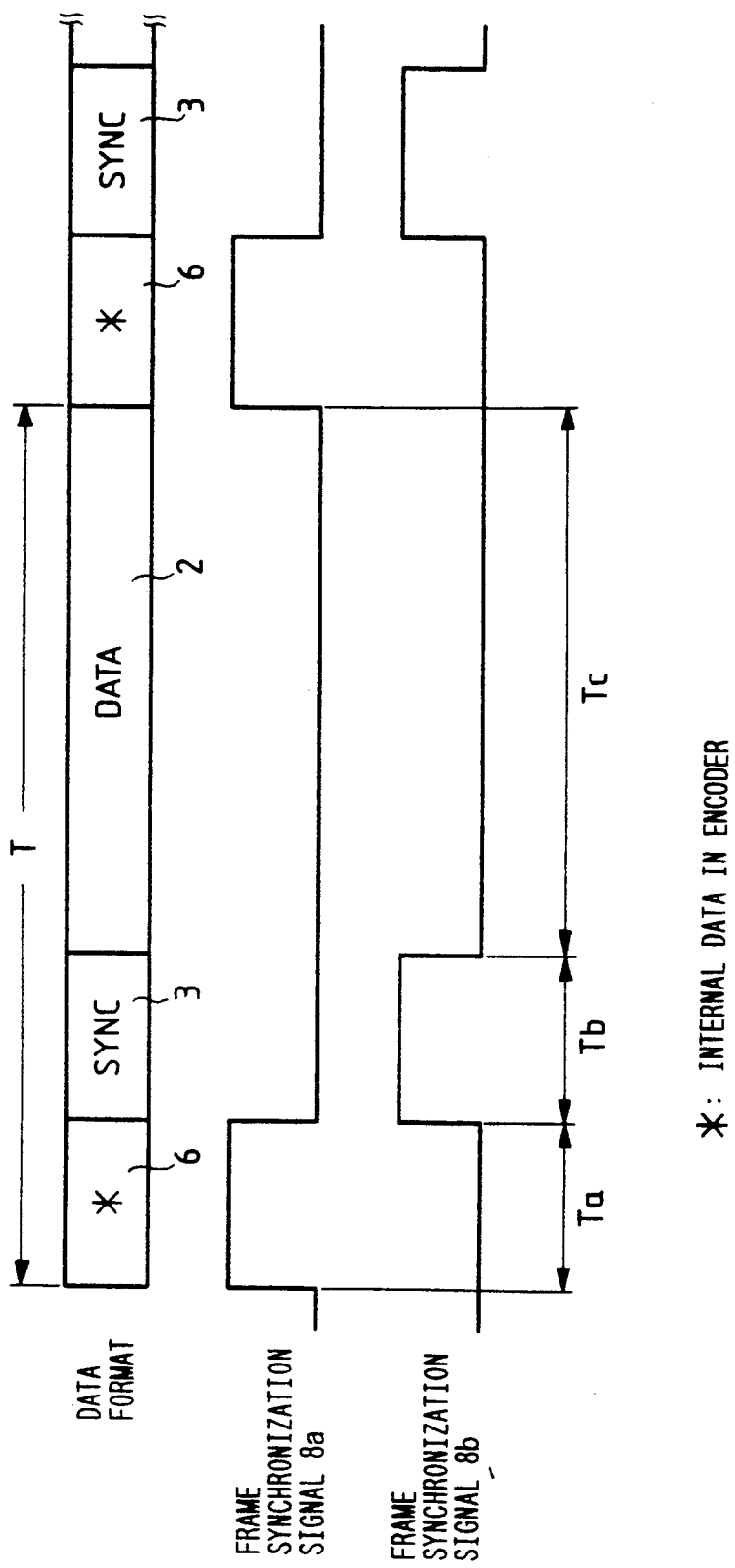
FIG. 15 is a timing chart showing the operation timing of the coder of FIG. 4.

A second embodiment of this invention will be described by referring to FIGS. 15 to 17.

Figure 16:
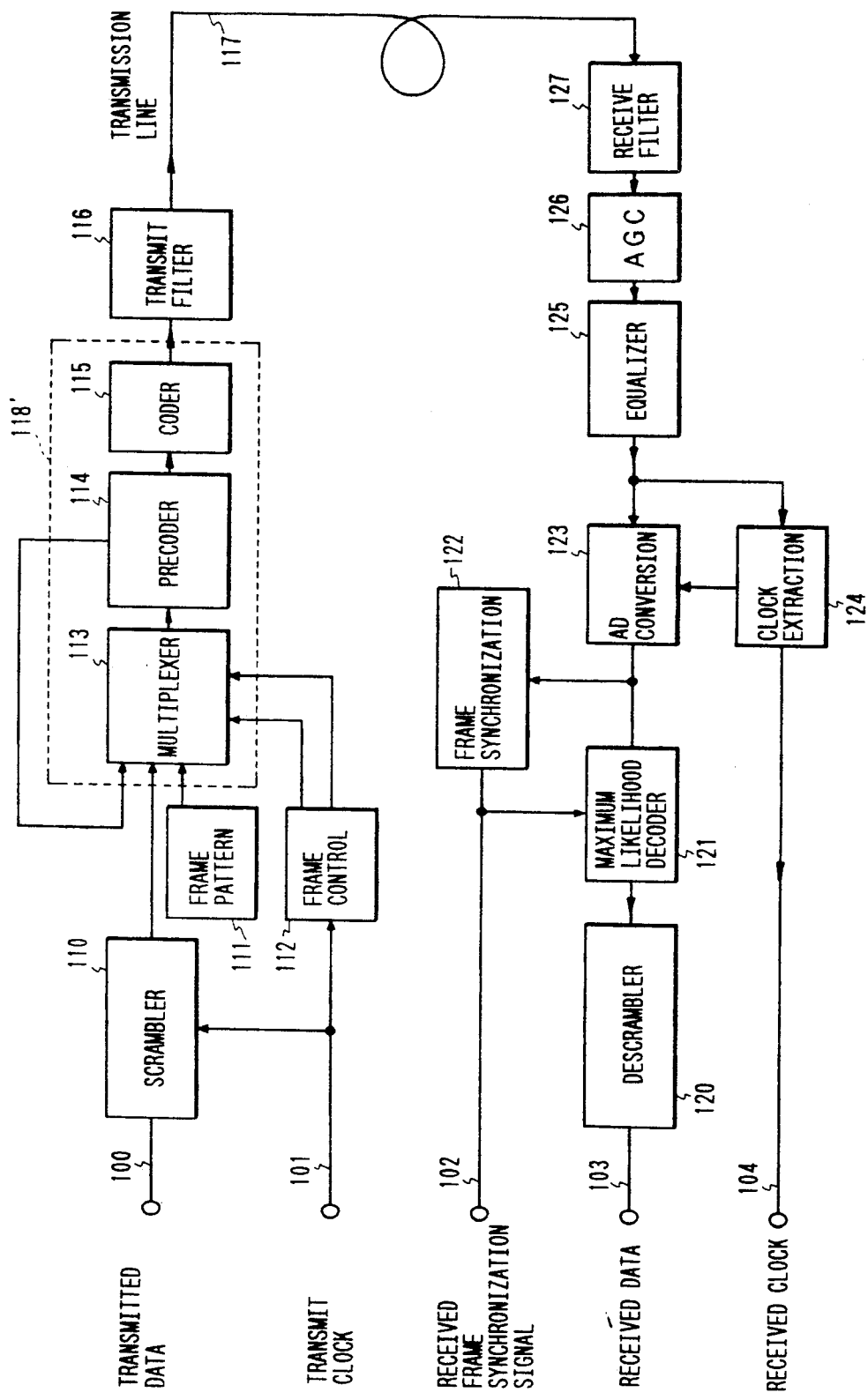
FIG. 16 is a block diagram showing the second embodiment of the invention as applied to the correlation code transmission system.

FIG. 16 shows the configuration of a transmission system to which a second embodiment of this invention is applied. What differs from FIG. 4 is that the multiplexer 113 has three inputs and that the internal data of the precoder 114 is input to the multiplexer 113. Hence, the output of the frame controller 112 has two lines.

Figure 17:
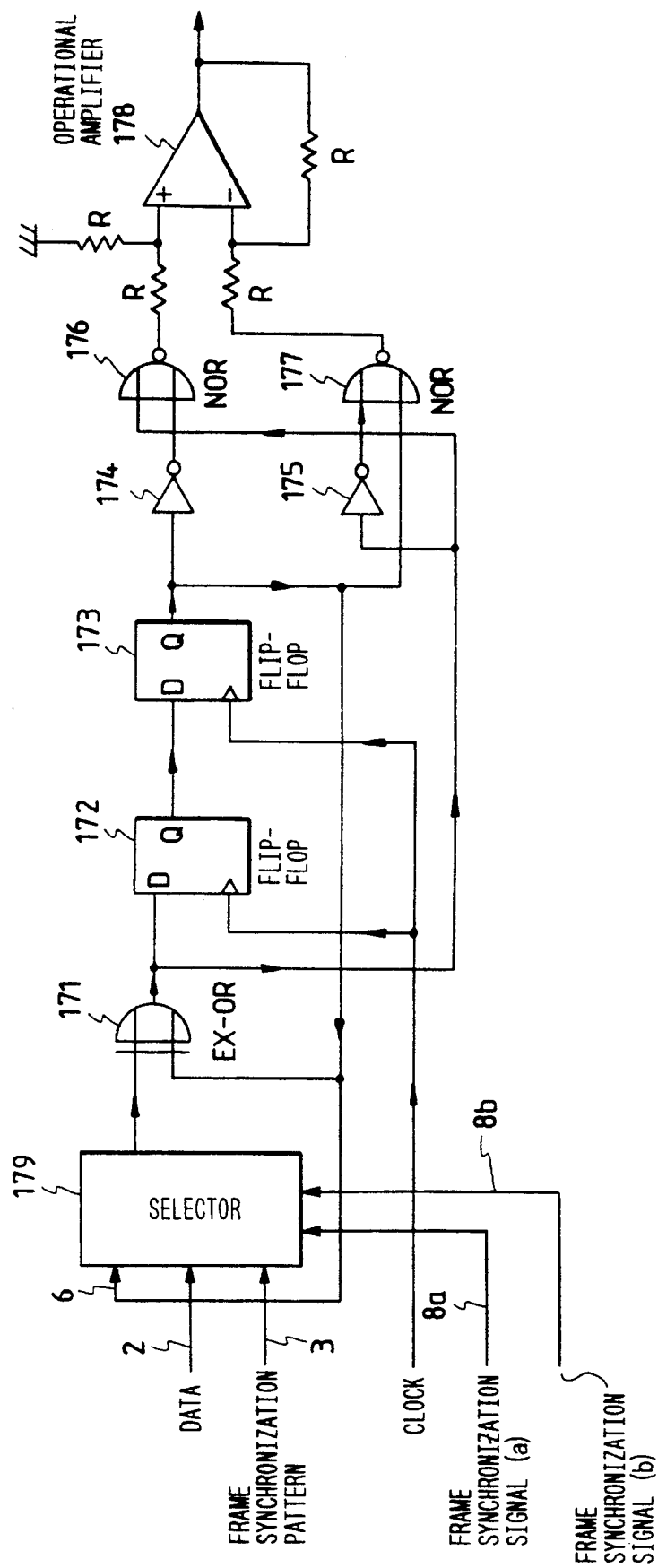
FIG. 17 is a circuit diagram showing the configuration of the coder in FIG. 16.

FIG. 17 shows the configuration of a coder 118' when $F(D)=1-D^2$ is chosen as the coding rule. The 3-input selector outputs 179, according to the timing shown in FIG. 15, either data 2, frame synchronization pattern 3, or internal data 6 of the coder 118'. Take an example case of the transmit clock being 4.096 MHz and the frame period T 125 μs. The time duration $T_A$ in which the internal data 6 is output is 2 bits long, about 488 ns, because the coder 118' uses two flip-flops 172, 173. Assuming that the duration in which the frame synchronization pattern 3 is output is 6 bits long, about 1.46 μs, the duration in which the data 2 is output is 504 bits long, about 123 μs. Now, let us turn again to FIG. 17. The internal data 6 is also connected to one of the inputs of the Exclusive-OR circuit 171 which is used as the modulo-2 adder. When the selector 179 outputs the internal data 6, the two inputs of the Exclusive-OR circuit 171 agree, so that its output is definitely zero. This output is entered into the flip-flops 172, 173 successively, thereby resetting the register. Then, the internal data 6 is coded by the coder 118' and the levels shown in the following table are obtained at the output of the operational amplifier 178 in response to the contents of the flip-flops 172, 173 that existed just before the resetting.

| Contents of 172 | Contents of 173 | Output of 178 | |
|---|---|---|---|
| 0 | 0 | 0 | 0 |
| 0 | 1 | −A | 0 |
| 1 | 0 | 0 | −A |
| 1 | 1 | −A | −A |

Since the internal data 6 represents the parity of the transmitted data in one frame, it can be used for parity check within the receiver.

While in this embodiment explanation has been given for the case of the binary transmitted data, a multilevel signal can also be dealt with by a similar configuration.

Figure 18:
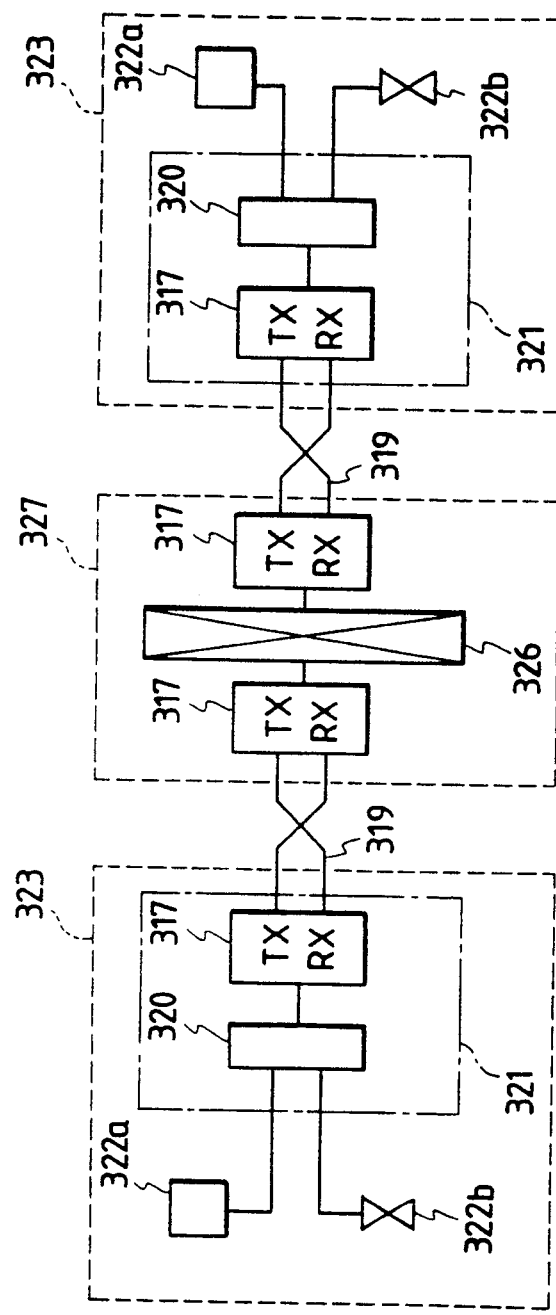
FIG. 18 is a diagram showing an example application of this invention to a communication system.

Next, we will explain about an example of application of the transmission system described in the foregoing. FIG. 18 shows an exchanger to which this invention is applied. A terminal 323 and the exchanger 327 are interconnected through telephone lines 319. The exchanger 327 consists of an exchanging circuit 326 and a transmission circuit 317. The terminal 323 consists of a communication interface 321, a data terminal 322a, and a telephone 322b. The communication interface 327 further consists of a transmission circuit 317 and a protocol processing unit 320. This invention is used in a system having two transmission circuits 317 interconnected by the telephone lines 319. A part of the configuration of the transmission circuit 317 is shown in FIG. 4 and FIG. 16.

With this invention it is possible to transmit a fixed frame synchronization pattern in the correlation code transmission system.

The generation of fixed frame synchronization pattern allows the frame synchronization pattern to be directly monitored on the transmission line without having to connect a receiver to the line. This function makes it possible to immediately decide in each frame period which channel is in use in a system that has a plurality of logical channels. Further, by resetting at constant intervals bit errors that occurred in the precoder, the error propagation can be suppressed to less than the maximum frame length, improving the bit error rate. Moreover, since it is possible for the receive to derive binary data from the transmission code and to perform frame synchronization prior to the data decoding by the maximum likelihood decoding, a high-speed pull-in is possible that does not depend on the delay in the above processing circuits.

Furthermore, with this invention the internal data of the coder is taken out to be used as an input to the coder itself, eliminating the possibility of code violation, which in turn allows the use of a conventional Viterbi decoder.

The correlation code transmission system of this invention can be applied as a transmission circuit of the transmission system, in which the frame synchronization pattern is fixed on the transmission line to facilitate the observation on the transmission line of the transmitted data. It can also be used as a transmission circuit of the transmission system in with the frame synchronization pattern is fixed on the transmission line without generating code violations to make the monitoring of the transmitted data easy.

Figure 1:
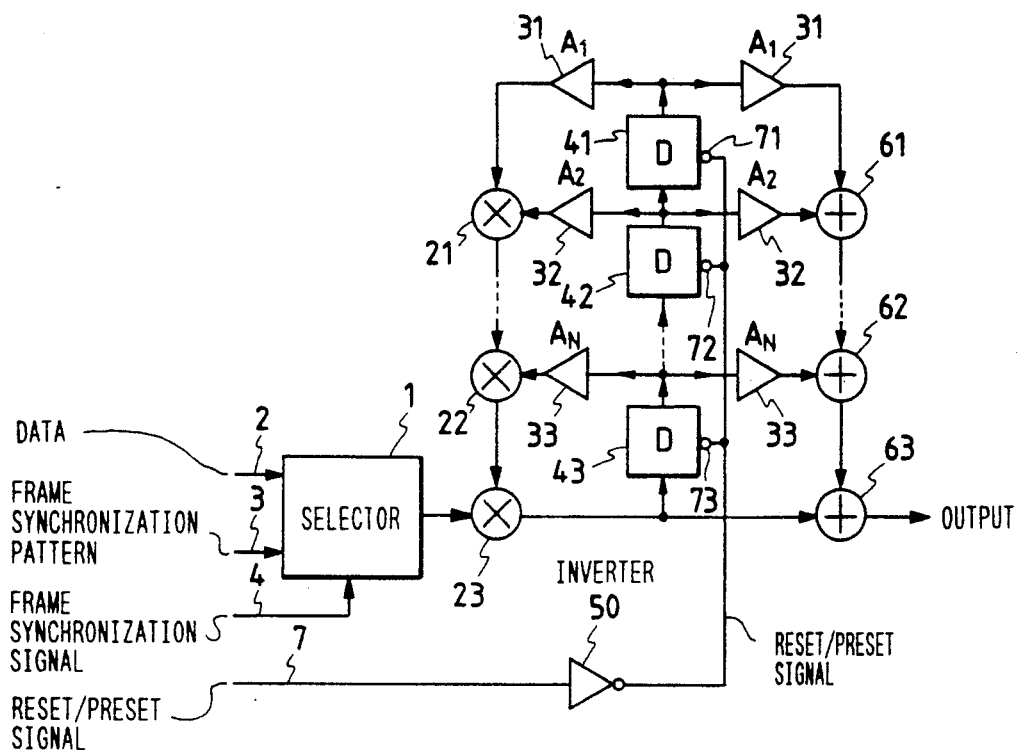
FIGS. 1 and 2 are schematic diagrams showing the configurations of decoders according to this invention.
Figure 2:
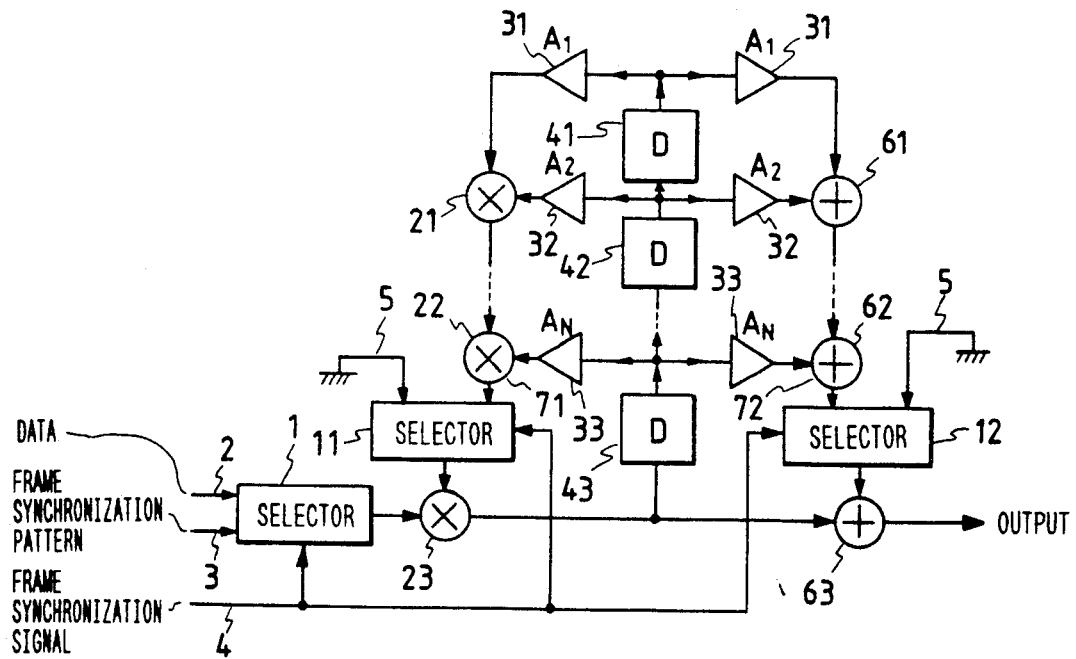
Figure 14:
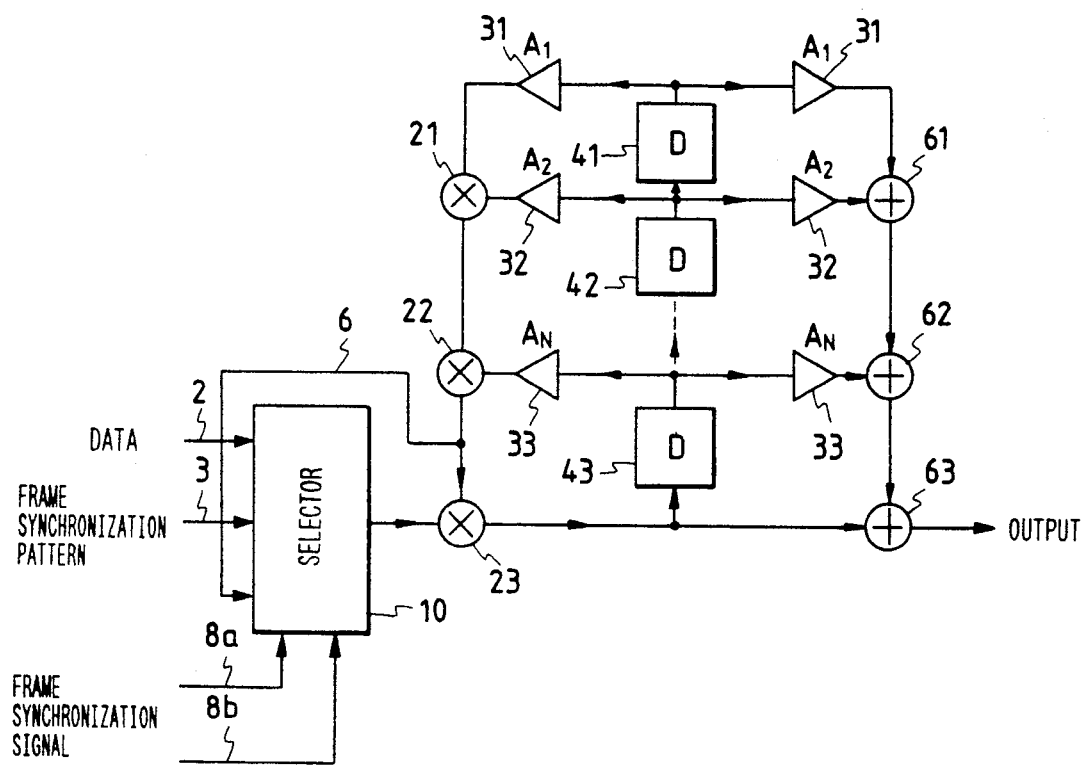
FIG. 14 is schematic diagram showing the configuration of a coder as a second embodiment of the invention.

In particular, by setting to two the number of the registers contained in FIG. 1 (or FIG. 2 or 14), the coder of this invention can be applied as a coder that performs a partial response class 4 (PR4) coding.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A correlation code transmission system in which a transmission level is determined by using a series of data that has already been transmitted and present data being transmitted, said correlation code transmission system comprising:
   means for selectively outputting transmission data and frame synchronization data;
   a plurality of memories to temporarily store a series of data including said transmission data and said frame synchronization data;
   calculation means to output the transmission level which is determined by a combination of contents of said memories; and
   means for resetting or presetting all contents of said memories at specified constant intervals so as to output a predetermined fixed pattern in each frame synchronization data period.

2. The correlation code transmission system as claimed in claim 1, wherein said resetting or presetting operation is performed after the last transmission data in each frame is input.

3. The correlation code transmission system as claimed in claim 1 further comprising a coder for generating a transmission frame from fixed frame synchronization pattern that satisfies a coding rule of a correlation code being used and is entered into said coder which is in a reset or preset state.

4. The correlation code transmission system as claimed in claim 1 further comprising a receiver includes means for extracting the frame synchronization pattern and a maximum likelihood decoding means that makes use of redundancy of the correlation code, and the decoding means operation is locked by a frame synchronization signal extracted by the frame synchronization pattern extracting means to remove adverse effects of resetting and presetting operations.

5. The correlation transmission system as claimed in claim 1 further comprising a coder for generating a transmission frame from a fixed frame synchronization pattern that violates a coding rule of a correlation code being used and is entered into said coder which is in a reset or preset state.

6. The correlation code transmission system as claimed in claim 5, wherein when the correlation code is a partial response class 4 (modified duobinary), said fixed frame synchronization pattern is (A, A, A), (−A, −A, −A), (−A, A, −A), (A, −A, A), (A, O, A), and (−A, O, −A) (where A is an arbitrary level).

7. A correlation code transmission system in which a transmission level is determined by using a series of data that has already been transmitted and present data being transmitted, said correlation code transmission system comprising:
   means for selectively outputting transmission data and frame synchronization data;
   a plurality of memories to temporarily store a series of data including said transmission data and said frame synchronization data;
   a plurality of first calculation means for calculating data output from each of said memories;
   selecting means for selecting data output from said first calculation means or zero level data according to each frame synchronization data period; and
   a plurality of second calculation means for calculating data output from said selecting means and data from said outputting means.

8. The correlation code transmission system as claimed in claim 7, wherein the output of the memories can be bypassed.

9. A correlation code transmission system, comprising:
   a transmitter to generate a transmission frame from transmission data and send said generated transmission frame on a transmission line; and
   a receiver to receive said transmission frame and decode said transmission data received;
   said transmitter further comprising:
   a transmit clock generating circuit;
   a frame synchronization pattern generating circuit to generate a frame synchronization pattern;
   a control circuit to output a frame synchronization signal in response to a transmit clock from said transmit clock generating circuit;
   a selector having first to third input lines, said selector being adapted to selectively output an input signal from an input line according to said frame synchronization signal; and
   a coder to generate said transmission frame from an output of said selector,
   whereby said transmission data is entered into a first input line of said selector, said frame synchronization pattern from said frame synchronization pattern generating circuit is entered into a second input line, and an internal signal of said coder is entered into a third input line.

10. The correlation code transmission system, as claimed in claim 9, wherein said coder comprises a plurality of registers to temporarily store said transmission data, a first group of operators to operate on the output signals from the registers and said selector output, and a second group of operators to add up the output signals of the registers and output the added result as said transmission frame, and a signal supplied to the operators that directly operate on said selector output is used as an internal signal of said coder.

* * * * *